United States Patent
Dodson

[19]

[11] Patent Number: 6,023,747
[45] Date of Patent: Feb. 8, 2000

[54] METHOD AND SYSTEM FOR HANDLING CONFLICTS BETWEEN CACHE OPERATION REQUESTS IN A DATA PROCESSING SYSTEM

[75] Inventor: John Steven Dodson, Pflugerville, Tex.

[73] Assignee: International Business Machines Corporation, Armonk, N.Y.

[21] Appl. No.: 08/992,133

[22] Filed: Dec. 17, 1997

[51] Int. Cl.[7] .............................. G06F 12/00; G06F 13/00
[52] U.S. Cl. .......................... 711/141; 711/118; 711/136; 711/159; 711/160; 711/133
[58] Field of Search ................................ 711/3, 117, 118, 711/119, 120, 133, 141, 145, 146, 154, 159, 160

[56] References Cited

U.S. PATENT DOCUMENTS

| | | | |
|---|---|---|---|
| 4,080,652 | 3/1978 | Cronshaw et al. | 711/160 |
| 4,422,145 | 12/1983 | Sacco et al. | 711/160 |
| 4,511,994 | 4/1985 | Webb et al. | 711/160 |
| 4,516,203 | 5/1985 | Farber et al. | 711/3 |
| 5,206,941 | 4/1993 | Eikill et al. | 711/141 |
| 5,214,776 | 5/1993 | Bagnoli et al. | 711/141 |
| 5,228,136 | 7/1993 | Shimizu et al. | 711/141 |
| 5,530,833 | 6/1996 | Iyengar et al. | 711/128 |
| 5,664,149 | 9/1997 | Martinez, Jr. et al. | 711/141 |
| 5,848,283 | 12/1998 | Moore et al. | 712/40 |
| 5,860,159 | 1/1999 | Hagersten | 711/151 |

*Primary Examiner*—Tuan V. Thai
*Attorney, Agent, or Firm*—Volel Emile; Brian F. Russell; Andrew J. Dillon

[57] ABSTRACT

A method and system for managing a cache including a plurality of entries are described. According to the method, first and second cache operation requests are received at the cache. In response to receipt of the first cache operation request, which specifies a particular entry among the plurality of entries, a single access of a coherency state associated with the particular entry is performed. Thereafter, in response to receipt of the second cache operation request, a determination is made whether servicing the second cache operation request requires replacement of one of the plurality of entries. In response to a determination that servicing of the second cache operation request requires replacement of one of the plurality of entries, an entry is identified for replacement. If the identified entry is the same as the particular entry specified by the first cache operation request, the identified entry is replaced only after servicing the first operation request. The replacement of the identified entry includes writing contents of the identified entry into a lower level memory in association with an updated coherency state derived from the coherency state obtained during the single access. In this way, the second cache operation request can be serviced without again accessing the coherency state of the identified entry.

19 Claims, 4 Drawing Sheets

METHOD AND SYSTEM FOR HANDLING CONFLICTS BETWEEN CACHE OPERATION REQUESTS IN A DATA PROCESSING SYSTEM

BACKGROUND OF THE INVENTION

1. Technical Field

The present invention relates in general to a method and system for data processing and in particular to a method and system for cache management within a data processing system. Still more particularly, the present invention relates to a method and system for handling a conflict between two operation requests in the cache of a data processing system.

2. Description of the Related Art

To maximize data processing system performance, the memory of a data processing system is typically arranged hierarchically, with one or more lower levels of memory, which may include nonvolatile storage and a main store, and one or more upper levels of memory, which typically include one or more levels of cache. As will be appreciated by those skilled in the art, cache memory is typically small relative to the main store and affords the processor(s) within the data processing system relatively rapid access to data and instructions.

Cache memories in conventional data processing systems are typically set associative, that is, the main store address of data is utilized to map the data to a particular congruence class that contains multiple entries or members in which the data can be stored. The data (including instructions) stored within the cache are recorded in a cache directory utilizing tags derived from the main store address, typically by selecting predetermined address bits. Thus, in response to receiving a request address, logic within the cache directory compares each of the tags stored in the directory set corresponding to the congruence class to which the request address maps with the tag bits of the request address in order to determine whether or not data associated with the request address resides in the cache. If the associated data resides in the cache, a "hit" occurs and the data is handled in accordance with the type of the request. On the other hand, if the data does not reside in the cache, a "miss" occurs. If, for example, a miss occurs in response to a processor's read request, the contents of an entry within the congruence class must be replaced with the requested data. In addition, if the contents of the replaced entry are modified with respect to the contents of the corresponding address in the main store, the modified data must be written to a lower level cache or to the main store. This replacement operation is known as a castout. Based upon the principle of locality of reference, the entry that is replaced is typically selected in accordance with a least recently used (LRU) algorithm that determines the least recently accessed entry within the congruence class.

In order to maintain data coherency and consistency, multiprocessor data processing systems typically employ either a directory-based or snoop-based communication protocol that notifies cache memories of data accesses occurring elsewhere within the data processing system. The caches utilize the data access information, which hereinafter will be referred to as snoop requests, to invalidate data, writeback data, update the coherency status of directory entries, or take other appropriate action based upon the coherency protocol implemented within the data processing system.

The present invention includes a recognition that a problem can arise when snoop requests received by a cache conflict with cache operation requests received from the cache's associated processor. For example, if a snoop request requires the cache to update a particular directory entry and a read request mapping to the same congruence class as the snoop request misses in the cache, it is possible that the congruence class entry selected for replacement by the replacement algorithm in response to the miss is associated with the directory entry that must be updated in response to the snoop request. In the prior art, a conflict between a castout operation and a snoop operation has been handled in one of two ways.

First, the cache can handle the conflict between the castout operation and the snoop operation simply by delaying servicing the processor's read request (and the concomitant castout operation) until the update required by the snoop request has been performed. A problem with this prior art approach is that the cache must reread the directory entry to obtain the updated coherency status of the directory entry prior to performing the castout operation. Rereading the cache directory to ascertain the updated coherency status not only slows processor performance by increasing data latency, but also consumes valuable directory access bandwidth. The identification of which congruence class entry is to be replaced by the castout operation can also be complicated by the fact that the LRU bits identifying the least recently used entry may have changed between receipt of the read request that prompted the castout operation and the completion of the cache operation initiated in response to the snoop request.

Second, a cache can handle a conflict between a castout operation and a snoop request by replacing a congruence class entry other than the LRU entry. While the second solution improves upon the first in that both the snoop request and the read request can be serviced without delay, the selection of an alternative "victim" for replacement can require a deep logic path including numerous levels of logic gates. Because of the delay inherent in propagating signals through such deep logic paths, it would be preferable to identify an alternative solution for caches within state-of-the-art data processing systems that utilize high clock frequencies.

As should thus be apparent, it would be desirable to provide an improved method and system for efficiently handling a conflict between a two operations requests in a cache of a data processing system.

SUMMARY OF THE INVENTION

It is therefore one object of the present invention to provide an improved method and system for data processing.

It is another object of the present invention to provide an improved method and system for cache management within a data processing system.

It is yet another object of the present invention to provide an improved method and system for handling a conflict between two operation requests in the cache of a data processing system.

The foregoing objects are achieved as is now described. First and second cache operation requests are received at a cache. In response to receipt of the first cache operation request, which specifies a particular entry among the plurality of entries in the cache, a single access of a coherency state associated with the particular entry is performed. Thereafter, in response to receipt of the second cache operation request, a determination is made whether servicing the second cache operation request requires replacement of one of the plurality of entries. In response to a determination that servicing of the second cache operation request requires replacement of one of the plurality of entries, an entry is identified for replacement. If the identified entry is the same as the particular entry specified by the first cache operation request, the identified entry is replaced only after servicing the first operation request. The replacement of the identified entry includes writing contents of the identified entry into a lower level memory in association with an updated coherency state derived from the coherency state obtained during the single access. In this way, the second cache operation request can be serviced without again accessing the coherency state of the identified entry.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
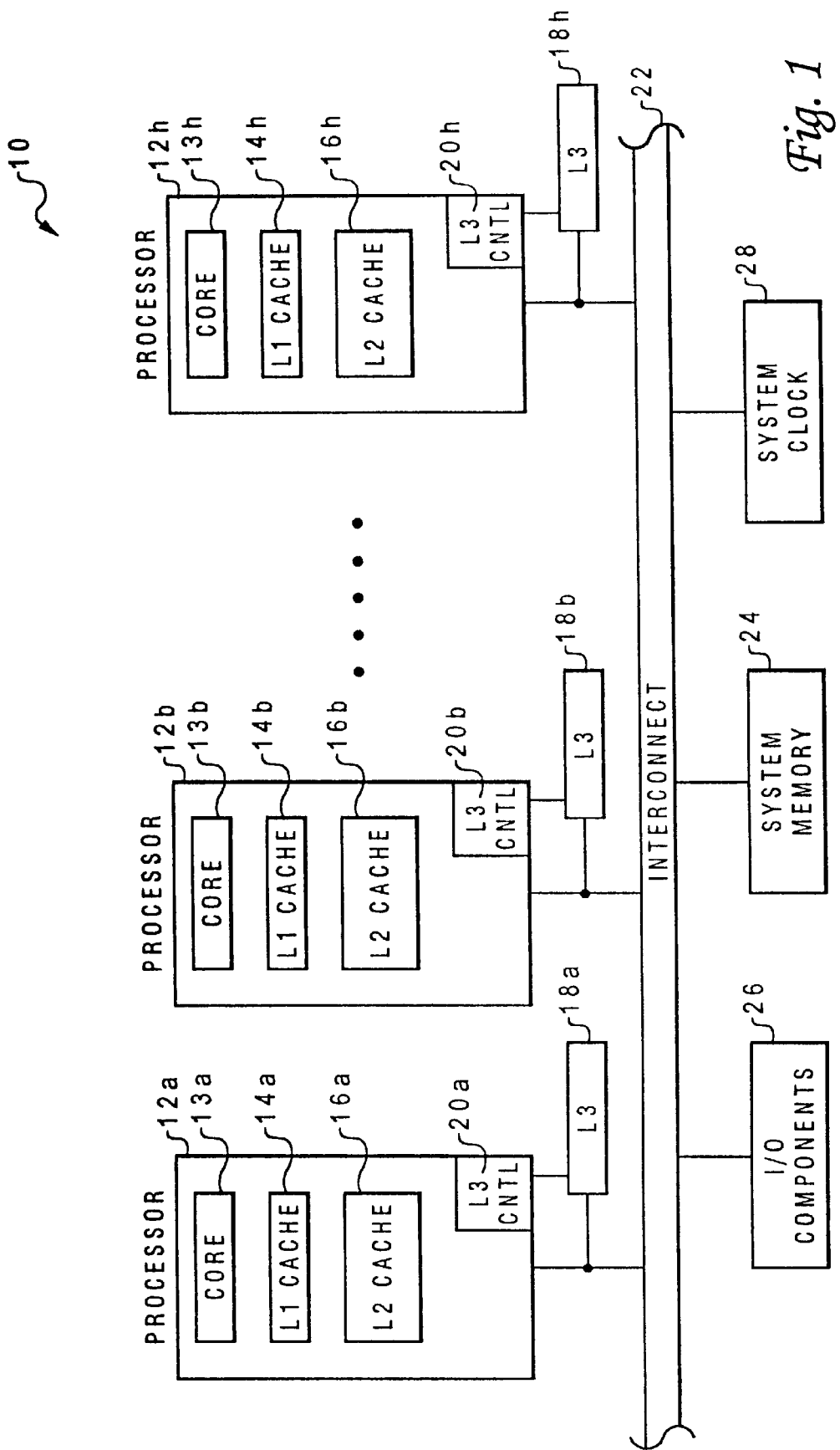
FIG. 1 depicts an illustrative embodiment of a data processing system in accordance with the present invention.

With reference now to the figures and in particular with reference to FIG. 1, there is depicted an exemplary embodiment of a multiprocessor data processing system in accordance with the present invention. As illustrated, data processing system 10 is a symmetric multiprocessor (SMP) data processing system including eight processors 12a–12h, which are each connected to interconnect 22, which can be implemented as a system bus or cross-bar switch. Also coupled to interconnect 22 are a system memory 24, which stores instructions and data for access by processors 12a–12n, and I/O components 26, which preferably include a number of components for providing both user and network interfaces to data processing system 10. The operation of the constituent components of data processing system 10 is synchronized by system clock 28.

In addition to a processor core 13, which may comprise, for example, complex instruction set computing (CISC) or reduced instruction set computing (RISC) circuitry, each of processors 12a–12h includes on-board level one (L1) and level two (L2) caches 14 and 16 and control logic 20 for an optional level three (L3) cache 18. As illustrated, each of L3 caches 18a–18h is coupled to a respective one of processors 12a–12h in a lookaside configuration such that all addresses and data transferred between a processor 12 and interconnect 22 are also received by the associated L3 cache 18.

As in conventional SMP systems, caches 14a, 16, and 18 each store a subset of the data and instructions contained in system memory 24. Because each of processors 12a–12h can modify data (and instructions) stored locally in one of its associated caches, caches 14, 16, and 18 implement one or more compatible coherency protocols (e.g., the conventional MESI protocol) so that a single view of the contents of system memory 24 is maintained for all processors 12. As will be understood by those skilled in the art, the coherency protocol(s) utilized by caches 14, 16, and 18 necessitate the transmission of various implementation-dependent coherency messages across interconnect 22 to inform remote caches 14, 16 and 18 of operations performed locally by a processor 12, to obtain needed data and instructions, to writeback modified data to system memory 24, and to perform other functions needed to maintain coherency. Each of the coherency messages transmitted across interconnect 24 is monitored (i.e., snooped) by each of L2 caches 16a–16h and L3 caches 18a–18h in order to determine if some cache operation by that cache is required in response to remote activity in data processing system 10. Such snooped coherency messages will hereinafter be termed "snoop requests" after receipt by one of L2 caches 16a–16h or L3 caches 18a–18h in to distinguish such requests from "processor requests" received from the associated one of processor cores 13a–13h.

Figure 2:
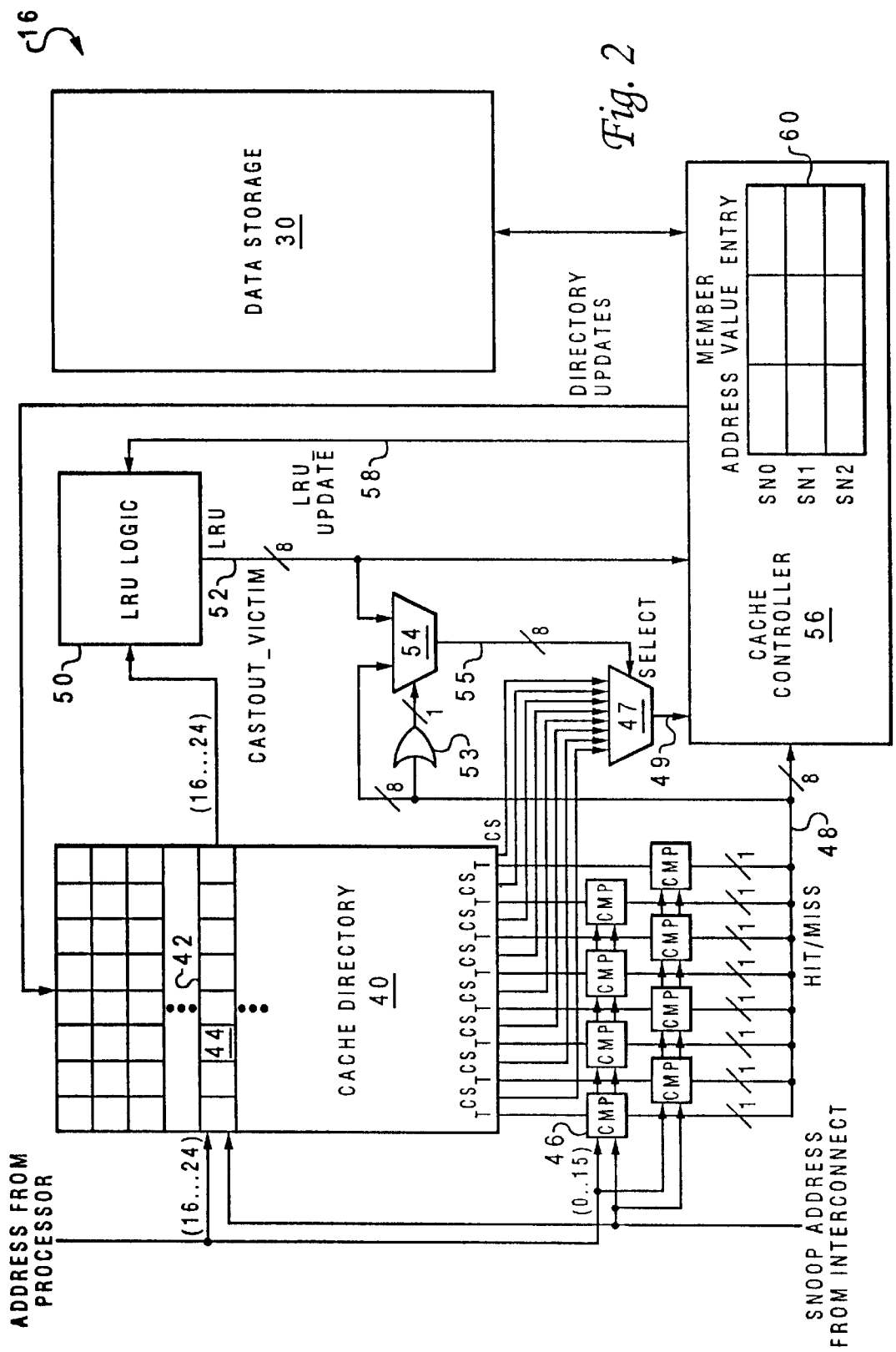
FIG. 2 illustrates a more detailed block diagram representation of a cache within the data processing system illustrated in FIG. 1.

Referring now to FIG. 2, there is illustrated a more detailed block diagram of an exemplary embodiment of an L2 cache 16 suitable for use in data processing system 10. In the exemplary embodiment shown in FIG. 2, data storage 30 of L2 cache 16 is an 8-way set associative array having 512 congruence classes and 128-byte cache lines for a total capacity of 512 kilobytes. In this embodiment, bits 16–24 of a 32-bit request address form an index that maps a request address to a particular congruence class within data storage 30, bits 0–15 of a request address form a tag that uniquely identifies a cache line stored in a congruence class entry (i.e., way), and bits 25–31 of a request address specify an offset between the data specified by the request address and the base address of the cache line to which the data belongs. Of course, other implementations of the present invention may utilize a different cache design.

As illustrated in FIG. 2, L2 cache 16 further includes cache directory 40, which includes a number of sets 42 that each correspond to a congruence class within data storage 30. Each set 42 contains 8 entries 44 that each store the tag and coherency state of a corresponding member within the congruence class with which the set 42 is associated. L2 cache directory 16 also includes LRU logic 50, which stores an indication of how recently each entry within each congruence class of data storage 30 has been accessed. Thus, the indication within LRU logic 50 associated with each congruence class indicates the least recently accessed member, the second least recently accessed member, the third least recently accessed member, and so on. In response to receipt of index bits that specify a congruence class, LRU logic 50 generates an 8-bit decoded CASTOUT_VICTIM signal 52 that indicates, by the position of a single bit set to 1, the LRU member of the specified congruence class.

During operation of data processing system 10, L2 cache 16 receives request addresses associated with cache operation requests from both its associated processor core 13 (via L1 cache 14) and from interconnect 22. As illustrated in FIG. 2, index bits 16–24 of each request address received by L2 cache 16 are input into both cache directory 40 and LRU logic 50. In response to receipt of index bits 16–24, LRU logic 50 outputs an 8-bit CASTOUT_VICTIM signal 52, which, as noted above, indicates a member of the selected congruence class that may possibly be replaced in response to the cache operation request. CASTOUT_VICTIM signal 52 is input into both cache controller 56 and multiplexer 54.

Cache directory 40 utilizes index bits 16–24 to select a set 42. The tag (T) stored within each entry 44 of the selected set 42 is then individually compared with the tag bits of the request address utilizing comparators 46, which each produce a 1-bit match indication. The 8 bits output by comparators 46 together form a decoded HIT/MISS signal 48, which is input into cache controller 56, multiplexer 54, and OR gate 53. OR gate 53 logically combines 8-bit HIT/MISS signal 48 to produce a 1-bit hit/miss signal that selects HIT/MISS signal 48 as the output of multiplexer 54 in response to a hit and selects CASTOUT_VICTIM signal 52 as the output of multiplexer 54 in response to a miss. The 8-bit output of multiplexer 54 forms a decoded SELECT signal 55.

In parallel with the comparison of the tag bits by comparators 46, the coherency state (CS) and tag (T) stored within each of the 8 entries of the selected set 42 are input into multiplexer 47. SELECT signal 55 then selects as the output of multiplexer 47 the coherency state and tag associated with the matching member, if the request address hit in cache directory 40, or the coherency state and tag associated with the LRU member, if the request address missed in cache directory 40. The selected coherency state and tag 49 are then input into cache controller 56.

In response to receipt of the cache operation request, HIT/MISS signal 48, coherency state and tag 49, and CASTOUT_VICTIM signal 52, cache controller 56 performs data handling and directory update operations. For example, in response to a read request by the associated processor core 13 missing in cache directory 40, cache controller 56 places a request for the cache line containing the request address on interconnect 22, supplies the requested data to the associated processor core 13 upon receipt of the requested data from system memory 24 or one of L2 caches 16 and L3 caches 18, and stores the requested cache line in the congruence class member specified by CASTOUT_VICTIM signal 52. Alternatively, in response to a read request by the associated processor core 13 hitting in cache directory 40, cache controller 56 reads the requested data out of data storage 30 and supplies the data to the associated processor core 13. Whenever servicing a cache operation request requires access to or replacement of a congruence class entry, cache controller 56 generates an LRU_UPDATE signal 58 that is utilized by LRU logic 50 to update the LRU indication associated with the accessed congruence class.

In response to a snoop request missing in cache directory 40, no action is taken by cache controller 56. Snoop hits, on the other hand, are handled by cache controller 56 utilizing snoop queue 60. In the embodiment illustrated in FIG. 2, snoop queue 60 comprises three instances of snoop handling logic, SN0–SN2, which each have an address field for storing a snoop request address, an entry field for storing an 8-bit decoded indication of the congruence class entry specified by the snoop request address (provided by HIT/MISS signal 48), and a member value field for storing the coherency state and tag 49 of the specified entry. Snoop queue 60 permits three snoop requests to be serviced concurrently by cache controller 56 in accordance with a selected coherency protocol. As will be appreciated by those skilled in the art, additional concurrent snoop requests can be supported by increasing the queue depth of snoop queue 60.

Figure 3:
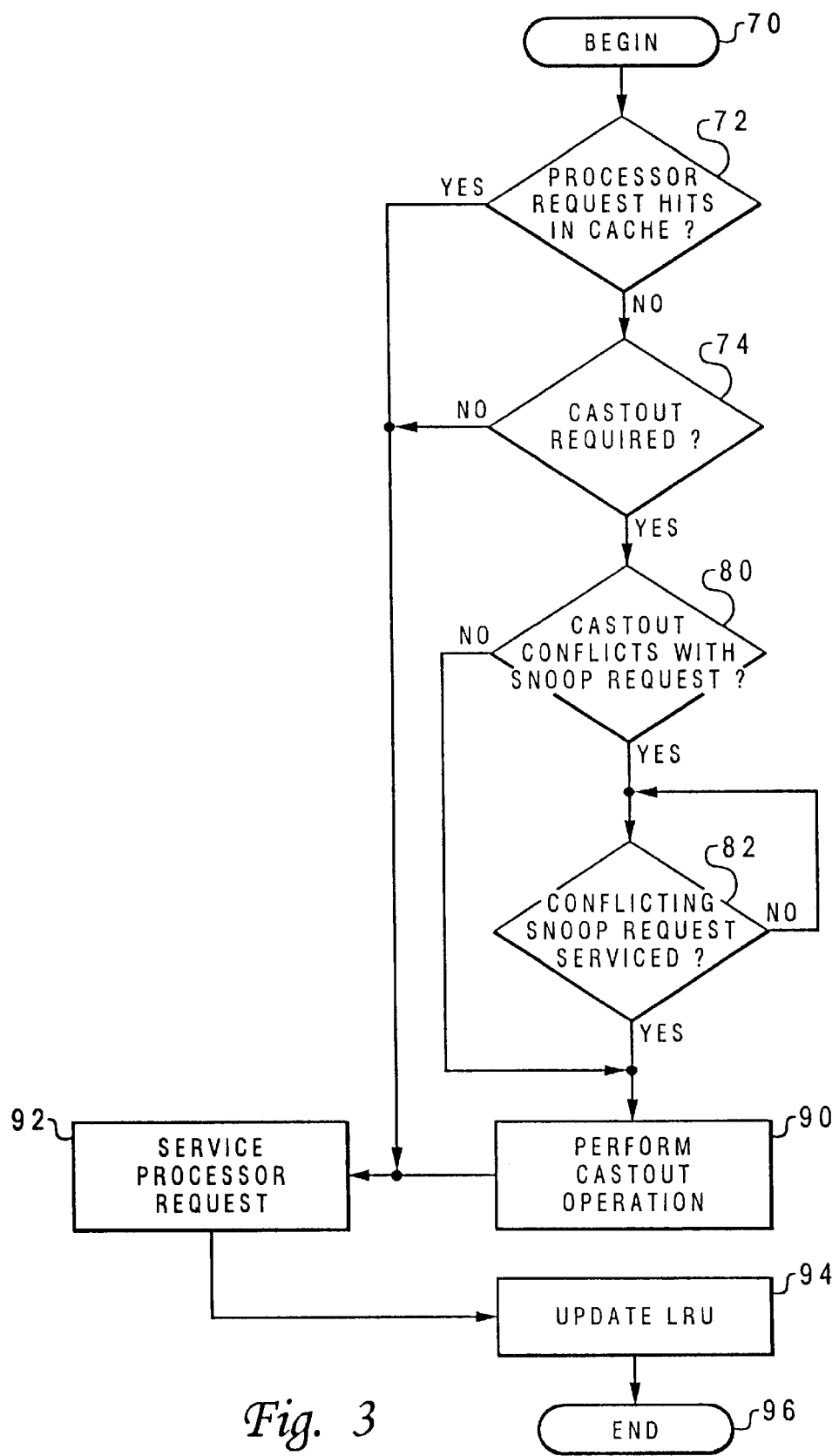
FIG. 3 is a logical flowchart depicting an illustrative embodiment of a method in accordance with the present invention for handling a conflict between cache operation requests.

As discussed supra, L2 cache 16 must make some provision for handling conflicts between processor requests and snoop requests and, in particular, conflicts between snoop requests and processor requests that entail cache line castouts. With reference now to FIG. 3, there is depicted a logical flowchart of an exemplary method by which an L2 cache can handle conflicts between snoop requests and processor requests that entail cache line castouts. As a logical flowchart, FIG. 3 is intended to convey the logical interrelationship between various actions and events within data processing system 10; it should be understood that the steps depicted therein need not all be performed sequentially and that many steps can be performed in parallel or in an alternative sequence. As illustrated, the process begins at block 70 in response to receipt by an L2 cache 16 of a processor request including a request address. Of course, receipt of the processor request (e.g., a read request) by L2 cache 16 means that the processor request has already missed in the upstream L1 cache 14. The process then proceeds from block 70 to block 72, which depicts a determination of whether or not the processor request hits in cache directory 40. If so, the process proceeds from block 72 to block 92, which illustrates cache controller 56 servicing the processor request, for example, by supplying requested data to the associated processor core 13. If necessary, LRU logic 50 then updates the LRU indication associated with the congruence class to which the request address maps in response to LRU_UPDATE signal 58, as illustrated at block 94. Thereafter, the process terminates at block 96.

Referring again to block 72, in response to a determination that the processor request address missed in cache directory 40, the process proceeds to block 74. Block 74 depicts a determination by cache controller 56 of whether or not a castout operation is required in response to the cache miss. If not, the process passes to blocks 92–96, which have been described. However, if a determination is made at block 74 that a castout operation is required in response to the cache miss, the process proceeds to block 80. Block 80 illustrates a determination of whether or not the castout operation conflicts with a snoop request in snoop queue 60. A conflict between a castout operation and a snoop request arises when the congruence class member specified by a snoop request is the LRU member identified for replacement in response to the miss of a processor request. If no conflict exists between the castout operation and a snoop request, the process passes to blocks 92–96, which have been described. However, in response to a determination that a conflict exists between the castout operation necessitated by the processor request and a snoop request, the process proceeds to block 82.

Block 82 depicts a determination of whether or not cache controller 56 has completed servicing the conflicting snoop request. If not, the process returns to block 82 in order to illustrate that cache controller 56 waits to perform the castout operation required by the processor request until the conflicting snoop request is serviced. Importantly, as discussed in greater detail below with reference to FIG. 4, logic within cache controller 56 determines the updated coherency state of the congruence class member that will be castout without again accessing cache directory 40 such that upon completion of servicing the snoop request, cache controller 56 is immediately ready to perform the castout operation. Thus, as indicated by the process proceeding from block 82 to block 90, upon completion of servicing the snoop request cache controller 56 performs the castout operation by deallocating the congruence class member specified by LRU logic 50 and, if the cache line contains modified data, by writing the cache line and its updated coherency state to the downstream L3 cache 18. Thereafter, the process passes to blocks 92–96, which have been described.

Figure 4:
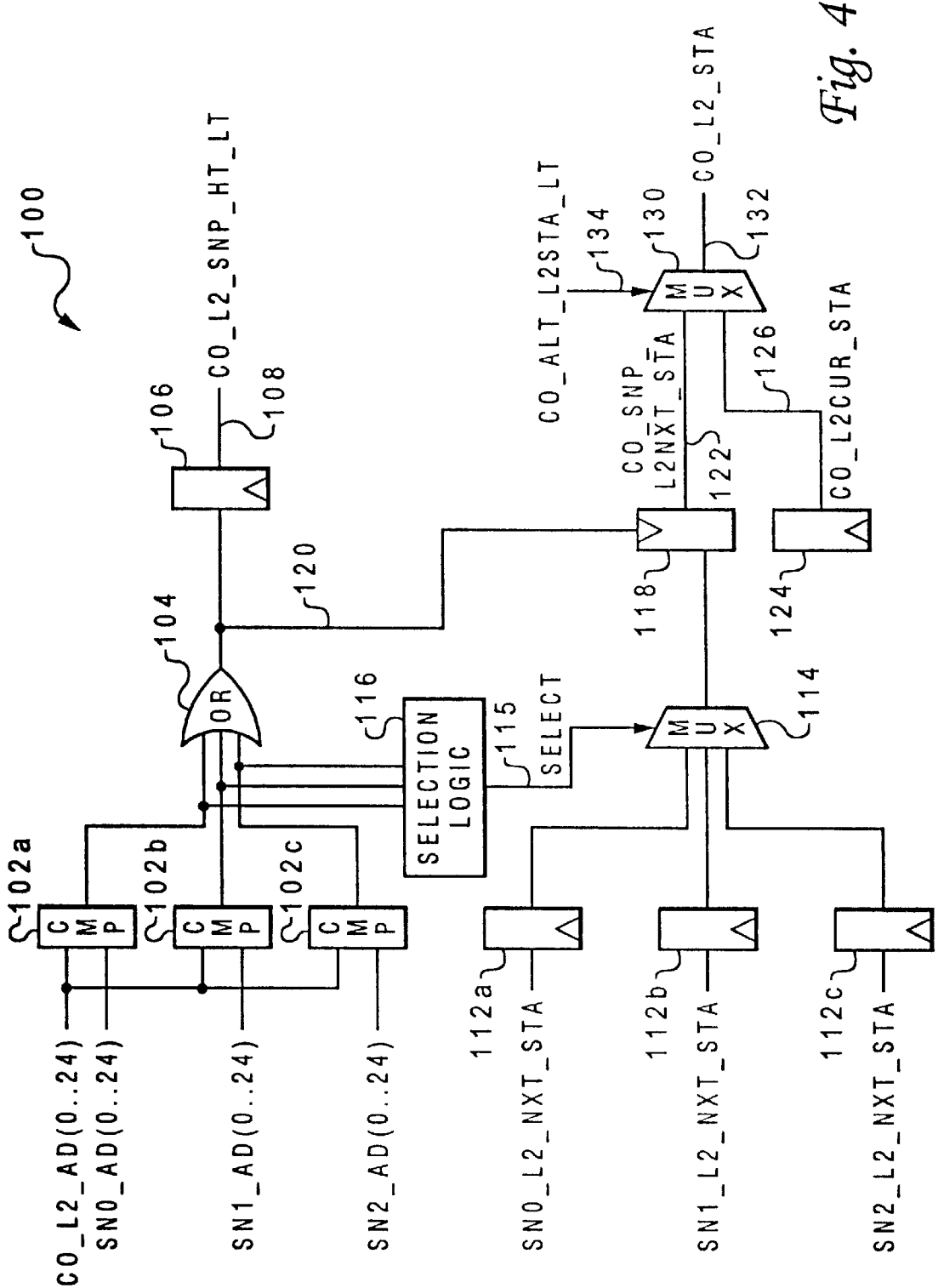
FIG. 4 illustrates a block diagram of an illustrative embodiment of conflict handling logic in accordance with the present invention.

Referring now to FIG. 4, there is depicted an illustrative embodiment of conflict handling logic 100 within cache controller 56 for handling conflicts between processor requests and snoop requests in accordance with the present invention. As depicted, conflict handling logic 100 includes comparators 102a–102c, which each compare the request address, if any, specified within a respective one of snoop queue entries SN0–SN2 with the 24 high order bits of a castout victim address generated by cache controller 56 in response to a processor request missing in cache directory 40. Cache controller 56 generates the castout victim address by concatenating bits 16–24 of the processor request address with the tag (bits 0–15) from coherency state and tag 49. In the depicted embodiment, a comparator output of logic high ("1") indicates that a conflict exists between the castout operation and a snoop request in one of entries SN0–SN2 of snoop queue 60. The outputs of each of comparators 102a–102c are then input into OR gate 104, which produces a 1-bit signal indicating whether a conflict exists between the castout operation and any of the snoop requests in snoop queue 60. This 1-bit signal is latched by latch 106 and output as CO_L2_SNP_HT_LT signal 108.

Conflict handling logic 100 further includes latches 112a–112c, which each receive as an input the next coherency state of the congruence class member specified by a respective one of snoop queue entries SN0–SN2. Those skilled in the art will appreciate that the determination of a next coherency state which a congruence class member will assume upon completion of servicing a snoop request is a conventional step and further is dependent upon the coherency protocol that is implemented. Accordingly, the logic utilized by the entries of snoop queue 60 to determine the next coherency state of congruence class members specified by snoop requests is omitted from FIG. 4. However, it is important to note that the next state determination is made by entries SN0–SN2 based upon their respective current coherency state, which is loaded into snoop queue 60 in parallel with the determination of whether the snoop request hit in cache directory 40. Latches 112a–112c output the next coherency states of the congruence class members specified by the snoop queue entries to multiplexeer 114.

In addition to the next coherency state signals, multiplexer 114 receives select signal 115, which is generated by selection logic 116 in order to indicate which congruence class member, if any, conflicts with the castout operation. In response to select signal 115, multiplexer outputs the selected next coherency state signal to latch 118. Latch 118, which receives the output of OR gate 104 as latch enable signal 120, outputs the next coherency state selected by multiplexer 114 to multiplexer 130 as CO_SNP_L2NXT_STA signal 122. Multiplexer 130 also receives as an input the initial coherency state of the congruence class member selected as the castout victim. This signal, which is designated in FIG. 4 as CO_L2CUR_STA signal 126, is latched from coherency state and tag 49 by latch 124 when the processor request missed in cache directory 40. Multiplexer 130 selects one of its inputs as CO_L2_STA 132, that is, the initial state of the congruence class member to be castout, based upon CO_ALT_L2STA_LT signal 134, which is a qualifying signal indicating that a conflict exists (or did exist) between a snoop request and a castout operation. Once an entry in snoop queue 60 completes the handling of the conflicting snoop request, CO_L2_SNP_HT_LT signal 108 goes inactive, and the castout logic in cache controller 56 uses CO_L2_STA signal 132 to determine how to proceed with the castout operation. For example, prior to servicing the snoop request, the congruence class member selected as the castout victim may be in a modified state, meaning that a castout operation would have to writeback the modified data to a lower level memory in order to maintain cache coherency. If servicing the snoop request invalidates the congruence class member selected as the castout victim, the castout operation need only to deallocate the castout victim (i.e., cache line).

Thus, as described above with reference to FIG. 3, CO_L2_SNP_HT_LT signal 108 indicates to cache controller 56 whether or not a conflict exists between a snoop request and a castout operation necessitated by a processor request miss. If a conflict exists, cache controller 56 delays handling the castout operation required by the processor request until CO_L2_SNP_HT_LT signal 108 goes inactive. At that point, cache controller 56 performs the castout operation utilizing the coherency state indicated by CO_L2_STA signal 132, thereby obviating the need to again access cache directory 40 to obtain the updated coherency state of the castout cache line.

While the invention has been particularly shown and described with reference to a illustrative embodiments, it will be understood by those skilled in the art that various changes in form and detail may be made therein without departing from the spirit and scope of the invention. For example, although the present invention has been illustrated and described in the context of an L2 cache, it should be understood that the present invention is equally applicable to other lower level caches (L3, L4, etc.).

What is claimed is:

1. A method of managing a cache including a plurality of entries, each of said plurality of entries having a respective coherency state associated therewith, said method comprising the steps of:

in response to receipt at said cache of a first cache operation request specifying a particular entry among said plurality of entries, performing a single access of a coherency state associated with said particular entry;

thereafter, in response to receipt at said cache of a second cache operation request, determining if servicing said second cache operation request requires replacement of one of said plurality of entries;

in response to a determination that servicing of said second cache operation request requires replacement of one of said plurality of entries, identifying an entry among said plurality of entries for replacement; and if said identified entry is said particular entry, replacing said identified entry only after servicing said first operation request, said replacing step including the step of writing contents of said identified entry into a lower level memory in association with an updated coherency state derived from said coherency state obtained during said single access.

2. The method of claim 1, wherein said first cache operation request comprises a snoop request and said second cache operation request comprises a processor request, said method further comprising the step of receiving said snoop request at said cache prior to said processor request.

3. The method of claim 1, said second cache operation request including a request address, wherein said step of determining if servicing said second cache operation request requires replacement of one of said plurality of entries comprises the step of determining if any of said plurality of entries stores data associated with said request address.

4. The method of claim 1, said plurality of entries comprising a congruence class, wherein said step of identifying an entry comprises the step of identifying a least recently accessed entry among said plurality of entries in said congruence class.

5. The method of claim 1, and further comprising the step of servicing said first cache operation request, wherein said servicing step includes the step of deriving said updated coherency state from said coherency state associated with said particular entry.

6. The method of claim 1, said cache including an indication of a least recently accessed entry among said plurality of entries, said method further comprising the step of updating said indication.

7. The method of claim 1, and further comprising the step of servicing the second cache operation request.

8. A cache, comprising:

a plurality of entries for storing data, each of said plurality of entries having a respective coherency state associated therewith;

means, responsive to receipt of a first cache operation request specifying a particular entry among said plurality of entries, for performing a single access of a coherency state associated with said particular entry;

means, responsive to thereafter receiving a second cache operation request, for determining if servicing said second cache operation request requires replacement of one of said plurality of entries;

means for identifying an entry among said plurality of entries for replacement in response to said determination; and means, responsive to said identified entry being said particular entry, for replacing said identified entry only after servicing said first operation request, said means for replacing including means for writing contents of said identified entry into a lower level memory in association with an updated coherency state derived from said coherency state obtained during said single access.

9. The cache of claim 8, wherein said first cache operation request comprises a snoop request and said second cache operation request comprises a processor request.

10. The cache of claim 8, said second cache operation request including a request address, wherein said means for determining if servicing said second cache operation request requires replacement of one of said plurality of entries comprises means for determining if any of said plurality of entries stores data associated with said request address.

11. The cache of claim 8, said plurality of entries comprising a congruence class, wherein said means for identifying an entry comprises least recently used (LRU) logic that indicates a least recently accessed entry among said plurality of entries in said congruence class.

12. The cache of claim 8, and further comprising means for servicing said first cache operation request, wherein said means for servicing includes means for deriving said updated coherency state from said coherency state associated with said particular entry.

13. A data processing system, comprising:

a processor;

a cache coupled to said processor and including:

a plurality of entries for storing data, each of said plurality of entries having a respective coherency state associated therewith;

means, responsive to receipt of a first cache operation request specifying a particular entry among said plurality of entries, for performing a single access of a coherency state associated with said particular entry;

means, responsive to thereafter receiving a second cache operation request, for determining if servicing said second cache operation request requires replacement of one of said plurality of entries;

means for identifying an entry among said plurality of entries for replacement in response to said determination; and means, responsive to said identified entry being said particular entry, for replacing said identified entry only after servicing said first operation request, said means for replacing including means for writing contents of said identified entry into a lower level memory in association with an updated coherency state derived from said coherency state obtained during said single access.

14. The data processing system of claim 13, wherein said first cache operation request comprises a snoop request and said second cache operation request comprises a processor request.

15. The data processing system of claim 13, said second cache operation request including a request address, wherein said means for determining if servicing said second cache operation request requires replacement of one of said plurality of entries comprises means for determining if any of said plurality of entries stores data associated with said request address.

16. The data processing system of claim 13, said plurality of entries comprising a congruence class, wherein said means for identifying an entry comprises least recently used (LRU) logic that indicates a least recently accessed entry among said plurality of entries in said congruence class.

17. The data processing system of claim 13, said cache further comprising means for servicing said first cache operation request, wherein said means for servicing includes means for deriving said updated coherency state from said coherency state associated with said particular entry.

18. The data processing system of claim 13, wherein said processor is a first processor and said cache is a first cache, said data processing system further comprising:

a second processor having a second cache coupled thereto; and an interconnect coupled between said first cache and said second cache.

19. The data processing system of claim 13, wherein said cache is a first cache, said data processing system further comprising a second cache coupled to said processor, wherein said second cache is an upper level cache and said first cache is a lower level cache.

* * * * *